Figure 8:
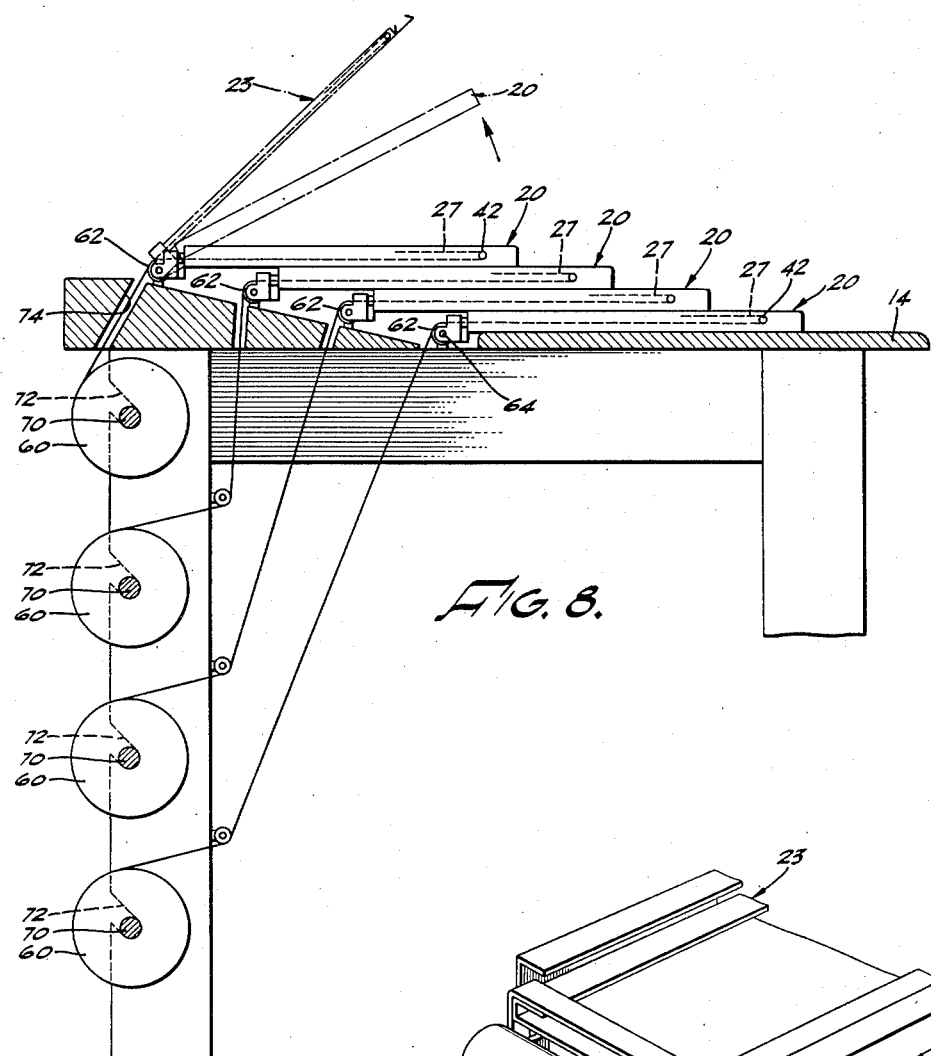

April 9, 1957 R. A. WILLIAMS 2,788,229
VISIBLE DATA ACCUMULATOR
Filed June 11, 1953 3 Sheets-Sheet 1
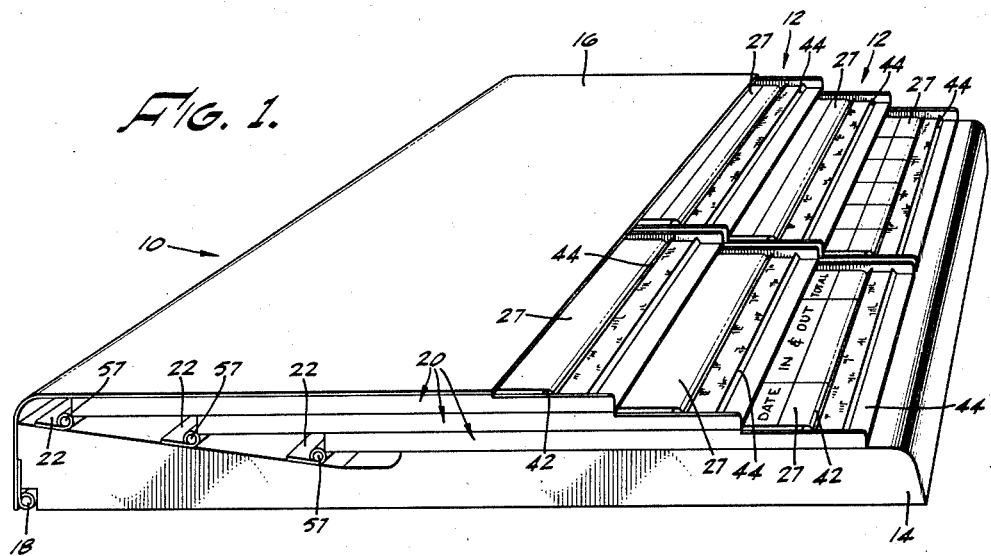
FIG. 1.
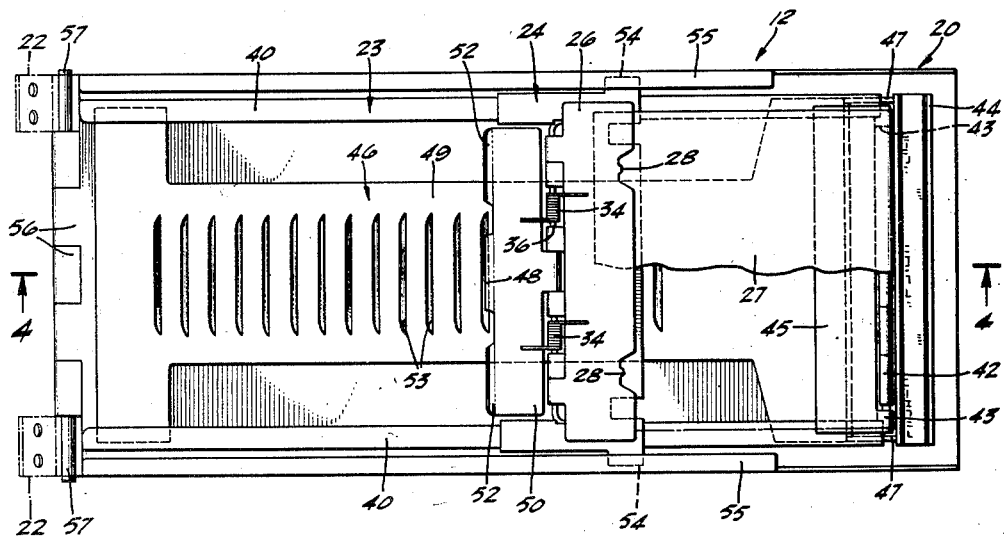
FIG. 2.
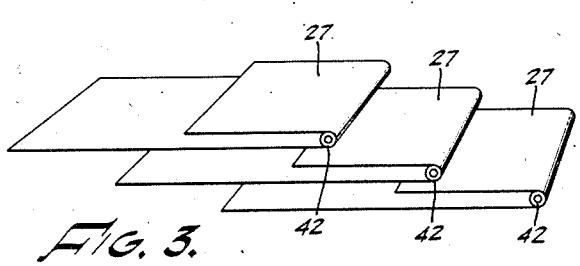
FIG. 3.
ROBERT A. WILLIAMS
INVENTOR.
BY
ATTORNEY April 9, 1957 R. A. WILLIAMS 2,788,229
VISIBLE DATA ACCUMULATOR
Filed June 11, 1953 3 Sheets-Sheet 2
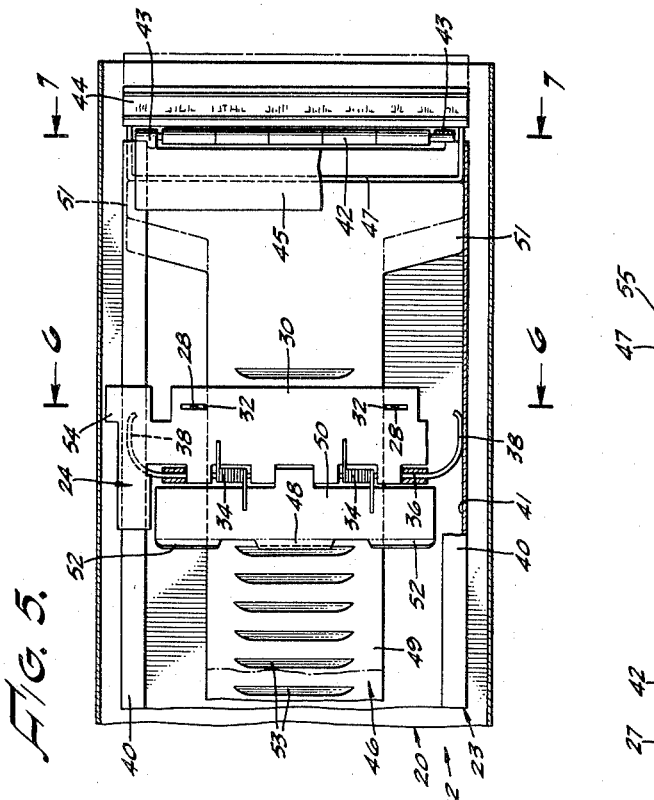
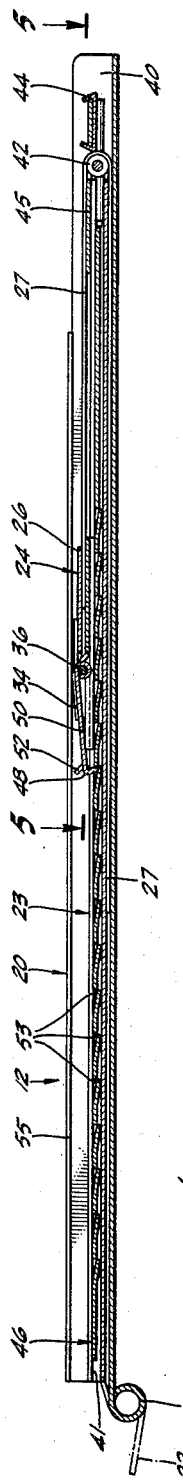
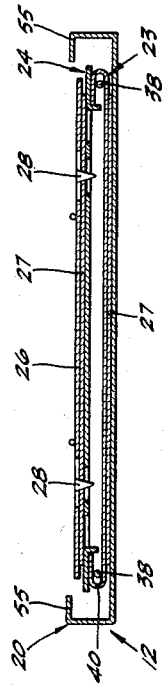
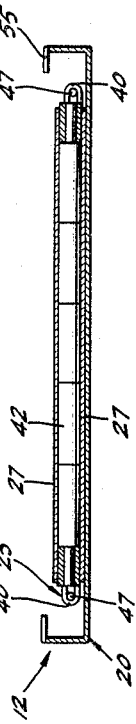
ROBERT A. WILLIAMS
INVENTOR.
BY
ATTORNEY April 9, 1957  R. A. WILLIAMS  2,788,229
VISIBLE DATA ACCUMULATOR
Filed June 11, 1953  3 Sheets-Sheet 3

ROBERT A. WILLIAMS
INVENTOR.
BY
ATTORNEY

United States Patent Office 2,788,229
Patented Apr. 9, 1957

2,788,229

VISIBLE DATA ACCUMULATOR

Robert A. Williams, Wilmington, Calif.

Application June 11, 1953, Serial No. 360,946

1 Claim. (Cl. 281—1)

My present invention relates to a visible data accumulator to be used for compiling data for business control purposes, and it relates particularly to apparatus which is capable of keeping complete inventory control data and production control data, and other similar data.

The usual prior art procedure in compiling inventory control data, production control data and other similar control data for use in the operation of a business was to merely utilize accounting books and to make periodic compilations of the data which has been entered in those books. With this prior art system it was difficult to immediately ascertain the total inventory, the total amount or work accomplished, or the like, and it was particularly difficult to compare and correlate a plurality of such business control data totals in order, at any particular time to get an accurate picture of the conditions of operation of the business.

Thus, it has long been a problem in the art to provide apparatus which would tell at a glance the operating condition of an entire business, and which would have, at all times, summations of the various business control data, such as inventory control data and production control data.

It is therefore an object of my present invention to provide apparatus for accumulating business operation control data which at all times permits the summation of such data to be observed at a glance.

Another object of my invention is to provide apparatus for compiling together, data for a plurality of different business operation controls, so that the entire business operation may be observed at a glance, or any of the particular operations of the business may be likewise observed at a glance.

Another object of my invention is to provide apparatus of the character described which permits a photograph to be taken at any time in order to permanently record business operations at that time.

Another object of my invention is to provide apparatus of the character described which is simple and foolproof in operation, yet which can be used to compile large amounts of business data.

Other objects and advantages of my present invention will be apparent from the following descriptions and claim, the novelty of my invention consisting in the features of construction, the combinations of parts, the novel relations of the members and the relative proportioning, disposition and operation thereof, all as is more completely described herein and as is more particularly pointed out in the appended claim.

Figure 9:
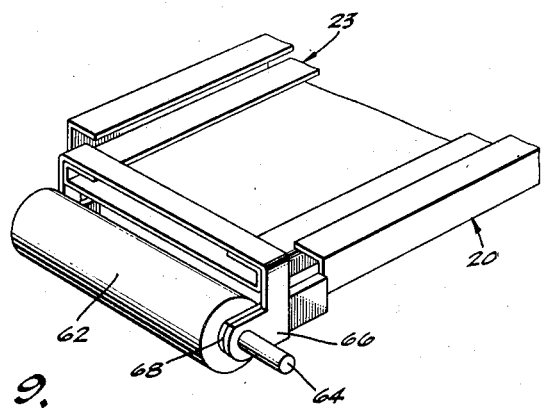

In the accompanying drawings, forming a part of my present specification,

Figure 1 is a perspective view showing six (6) of my basic accumulator units,

Figure 2 is a plan view of one of my accumulator units which has been removed from the assembly, with a portion broken away, Figure 3 is a diagrammatic perspective view showing the relationship of the paper strips and feed rollers in stacked and staggered relation, Figure 4 is an enlarged longitudinal section taken along the line 4—4 of Figure 2, Figure 5 is a horizontal section taken along the line 5—5 of Figure 4, Figure 6 is a vertical section along the line 6—6 of Figure 5, and shows my novel clip means to grip the paper strips, Figure 7 is a vertical section taken along the line 7—7 of Figure 5, and shows my novel feed roller and its mounting, Figure 8 is a vertical section showing a modified form of my invention wherein paper is fed from bulk rolls, and Figure 9 is a perspective view of a tray hinge from the rear in my modified form of Figure 8, showing paper roller and also carriage hinge.

Referring now to my drawings, my present invention consists, in general, of an accumulator assembly 10 having as its basic components a plurality of accumulator units 12, six (6) of these accumular units being shown in Figure 1 of the drawings.

The entire accumulator assembly 10 includes a base portion 14 and a cover portion 16 which is hingedly mounted on base portion 14 by means of a cover hinge 18. Cover 16 is considerably shorter than base 14 to permit observation of the data which is compiled on the accumulator units 12.

Each of the accumulator units 12 includes an accumulator unit housing 20 which is hingedly mounted on accumulator assembly base 14 by means of housing hinges 22. Housing hinges 22 are disposed in both horizontally and vertically staggered relationship to each other in the manner best shown in Figure 1 of the drawings. This permits accumulator unit housings 20 to be stacked one upon the other in the manner shown in Figure 1, and also permits the upper surfaces of the front ends of the accumulator units 12 to be observed.

Hingedly attached to each of my accumulator unit housings 20 is a tray unit 23, which is preferably mounted on the receptive housing hinge 22. Tray units 23 lie flat against the bottoms of the respective accumulator unit housings 20, and nest down within the side walls of the respective accumulator unit housings 20.

Each tray unit 23 is provided with a carriage unit 24 which is slideably mounted on the upper side of the tray unit 23. Side walls 40 are turned inwardly in order to form a track 41 to guide carriage unit 24 in its slideable relationship to tray unit 23.

Hingedly mounted on the upper side of carriage unit 24 upon a hinge pin 36 is a paper clamp 26 which extends forward from hinge pin 36. Paper clamp 26 is adapted to engage one end of a sheet of paper 27 by means of one or more downwardly extending teeth 28 formed on paper clamp 26. The main body of carriage unit 24 forms a lower jaw for paper clamp 26, and is provided with one or more toothed slots 32 which are adapted to receive teeth 28.

One or more clamp springs 34 are preferably disposed along hinge pin 36 and extend over paper clamp 26 in such a manner that paper clamp 26 is urged downwardly into clamping engagement with the end of paper sheet 27.

Referring now to Figure 5 of the drawings, hinge pin 36 is provided with an extension on each side of carriage unit 24, these extensions being spring tempered and forming carriage retarders 38 which frictionally engage tray side walls 40 within tracks 41. Carriage retarders 38 prevent carriage unit 24 from sliding backward along tray unit 23 inadvertently.

The paper sheet 27, one end of which is clamped to carriage unit 24 by means of paper clamp 26, is primarily retained between the flat upper surface of accumulator unit housing 20 and the flat lower surface of tray unit 23. Paper sheet 27 is fed from between accumulator unit housing 20 and tray unit 23 around a feed roller 42 disposed laterally across tray unit 23 near the front end thereof. This causes a portion of paper sheet 27 to be exposed along the upper surface of tray unit 23 between feed roller 42 and paper clamp 26. As carriage unit 24 is slid backwardly along tray unit 23, carrying the end of paper sheet 27 along with it, paper sheet 27 will be fed from between accumulator unit housing 20 and tray unit 23 upwardly around feed roller 42.

An actuating clip 44, which serves the dual function of an actuating clip and as information holder, is laterally disposed adjacent to and in front of feed roller 42. Actuating clip 44 is integrally connected to a ratchet plate 46 by means of a pair of rods 47 which lie inside of track 41.

Ratchet plate 46 extends substantially the entire length of tray unit 23, and rests flat against the upper surface of tray unit 23. The central portion 49 of ratchet plate 46 is considerably narrower than tray unit 23 so that ratchet plate 46 will not interfere with the operation of carriage unit 24. A plurality of lateral extension 51 on both ends of ratchet plate 46 are mounted in tracks 41 of tray unit 23 so that ratchet plate 46 is free to slide longitudinally in tray unit 23. Inward longitudinal movement of ratchet plate 46 is limited by abutment of actuating clip 44 against feed roller supporting members 43 which form an integral part of tray unit 23, preferably being a part of a flat, lateral paper guide 45 which is integrally connected at each end to the respective tray side walls 40 just behind feed roller 42.

Outward movement of ratchet plate 46 is limited by abutment of the front end of ratchet plate 46 against feed roller 42.

A pawl 48 is adapted to operatively engage the lateral slots 53 of ratchet plate 46. Pawl 46 forms an integral part of pawl lever 50 which is hingedly connected to carriage unit 24 by means of the hinge pin 36. The clamp spring or springs 34 may be used to urge pawl lever 50 downward to engage pawl 48 in slots 53 of ratchet plate 46.

The slots 53 of ratchet plate 46 slope upwardly toward the rear of the ratchet plate, so that movement of ratchet 46 to the rear causes engagement of pawl 48 in one of the slots 53 to move carriage unit 24 rearwardly, while forward motion of ratchet 46 will not move carriage unit 24 because of carriage retarders 38.

Thus, back and forth movement of actuating clip 44 between the limits heretofore described, which causes a consequent back and forth movement of ratchet plate 46 which is integrally attached to actuating clip 44, will cause a stepped movement of carriage unit 24 in a rearward direction. This stepped rearward movement of carriage unit 24 causes a similar stepped feeding of paper sheet 27 from its position between accumulator unit housing 20 and tray unit 23 around feed roller 42.

One or more upwardly slanting ears 52 form an integral part of pawl lever 50 to permit manual raising of pawl lever 50. Raising of pawl lever 50 by means of ears 52 permits carriage unit 24 to be slid forward over ratchet plate 46 to its extreme forward position so that an entirely new feeding operation may commence. After carriage unit 24 has thus been moved to its completely forward position, the paper sheet 27 which is now filled with the desired business data is removed by raising paper clamp 26 and sliding paper sheet 27 out of the apparatus.

In order to retain tray unit 23 in its operative position within accumulator unit housing 20 during operation of my apparatus, I provide lateral projections 54 on both sides of carriage unit 24. These lateral projections 54 normally slide directly underneath inward flanges 55 which form a part of side walls 25 of accumulator unit housing 20 to prevent pivoting of tray unit 23 with respect to accumulator unit housing 20. However, the removal of paper sheet 27 from my apparatus after paper sheet 27 is completely filled with entries, and the reloading of my apparatus with a fresh paper sheet 27, is facilitated by the termination of flanges 55 at a sufficient distance from the front end of accumulator unit housing 20 to permit lateral projections 54 to slide forwardly of inward flanges 55.

Housing hinge 22 and tray hinge 56 are preferably mounted on the same hinge pin 57 in order to conserve space and simplify my apparatus.

Referring now to Figures 8 and 9 of the drawings, I have there illustrated an alternative embodiment of my invention in which each of the paper sheets 27 is from a paper supply roll 60. This embodiment of my invention eliminates the necessity of reloading my apparatus each time a paper sheet of a specific length has been used.

Although paper supply rolls 60 may be disposed in any suitable position for feeding paper to my alternative apparatus shown in Figures 8 and 9, a peferred positioning of paper supply roll 60 is best illustrated in Figure 8. Here the rolls 60 are provided with axles 70 which nest in slots 72. The paper from the upper supply roll 60 passes through a passage 74 in accumulator assembly base 14 and then passes over paper supply hinge roller 62 which is mounted on hinge pin 64. Hinge pin 64 hingedly connects both accumulator unit housing 20 and tray unit 23 to base 14, the tray and housing hinges 66 and 68, respectively, being disposed at the ends of paper supply hinge roller 62. This positioning of tray and housing hinges 66 and 68, respectively, prevents the tray and housing hinges from interfering with the free flow of paper from paper supply roll 60 over paper supply hinge roller 62 into its operative positioning between accumulator unit housing 20 and tray unit 23, from which the paper is fed upward around feed roller 42 in the manner heretofore described.

The paper sheets 27 from the remaining three paper supply rolls 60 are deflected around guide rollers 76 and passed through suitable passages in base 14 to feed over paper supply hinge rollers 62 into position between accumulator unit housing 20 and tray unit 23.

Having completely described my preferred and alternative visbile data accumulator apparatus, I will now describe my preferred method of operating my visible data accumulator.

Assuming that a paper sheet 27 has been completely filled with the desired data, and it is now desirable to replace this used paper sheet 27 with a new paper sheet 27, the first step is to raise pawl lever 50 by means of ears 52 and slide carriage unit 24 to its completely forward position. This will free lateral projections 54 on carriage unit 24 from inward flanges 55 on housing 20 so that the entire tray unit 23, including carriage unit 24, may be pivoted upward out of accumulator unit housing 20 to facilitate the removal of the used paper sheet 27 and the insertion of the new paper sheet 27.

Then the used paper sheet 27 is removed from the apparatus by first lifting paper clamp 26 to free the end of paper sheet 27 from carriage unit 24 and then merely pulling out the used paper sheet 27. The new paper sheet is then disposed, in general, between accumulator unit housing 20 and tray unit 23, and the front end of this new paper sheet 27 is fed upward around feed roller 42 between actuating clip 44 and feed roller 42. This forward end of the new paper sheet 27 is then clamped to carriage unit 24 by means of paper clamp 26, and then tray unit 23 is pivoted back into its normal operating position inside of accumulator unit housing 20. Now the apparatus is ready for its data accumulating function.

Referring now to Figure 1, I have there illustrated my completely integrated apparatus.

In a typical business the two items of data which must be accumulated to determine whether the business is operating at a gain or at a loss are (1) inventory data, and (2) production data. The structure illustrated in Figue 1 is designed to accumulate both of these types of data. Thus, in the lower half of the illustration in Figure 1, the three actuating clips and information holders 44 will contain descriptions of three separate inventoried articles in production, one article for each of the actuating clips 44. If it is desired, more than one article may be described on a single actuating clip 44. The portions of paper sheets 27 exposed above the actuating clips 44 may be divided into columns for the convenient listing of data. If it is desired, these columns may be explained in notes placed just above and to the rear of the particular paper sheet 27 being explained. The first column of the sheet will usually designate the date. The second column of the inventory data accumulator sheet generally will be the "in and out" column in which the number of items added or subtracted is listed. The third column will then show the total number of inventoried items. The exposed portion of paper sheet 27 will be longitudinally divided into two sections, so that the rearward section discloses the last set of figures, including the last total, and the forward section is blank, ready to be filled in. After this forward section has been filled in, then actuating clip 44 may be manipulated to move the paper sheet one section rearwardly so that the last total is exposed, and another blank space is exposed.

Any number of my accumulator units 12 may be laminated in the lower half of the entire structure shown in Figure 1 according to the number of items which must be inventoried. There is actually no limit to the number of accumulator unit laminations which may be used.

Similarly, the actuating clips and information holders 44 of the accumulator units 12 in the upper half of Figure 1 contain a description of the articles in production. A typical paper sheet 27 in one of these accumulator units 12 will have six columns, the first for the date, the second for the name of the employee or his number, the third for the number of hours spent during the production, the fourth for the number of articles produced, the fifth for the total number of hours spent in this production, and the sixth for the total number of articles produced. These paper sheets 27 will have two longitudinal sections exposed, and the rearward section will normally be filled and the forward section will normally be empty. When a new entry is made in the empty portion, the actuating clip 44 is manipulated to move another empty section into view.

My alternative apparatus illustrated in Figures 8 and 9 of the drawings operates in exactly the same manner as my preferred embodiment of Figures 1 to 7, inclusive, with the exception that my alternative apparatus of Figures 8 and 9 does not need to be reloaded as often as my preferred embodiment.

One desirable method of operating my visible data accumulator is to photograph the entire exposed portion of my accumulator assembly 10 which contains the data. Such a photograph will, at any time, present an accurate picture of the present inventory, of the work in process, and of any other data which it is desired to accumulate, so that by this picture and by comparing successive pictures, it can be readily determined whether or not the business is profitable.

Although the accumulator assembly 10 which I have shown and described is adapted to be manually actuated, it is obvious that automatic means may be employed for actuating my carriage units 24 to move the paper sheet 27 without deviating from the spirit of my invention.

It is to be understood that the form of my invention herein shown and described is my preferred embodiment and that various changes in the shape, size and arrangement of parts may be resorted to without departing from the spirit of my invention or the scope of my appended claim.

I claim:

A data accumulator including a housing, a tray member seated in said housing and having a flat, exposed portion which is adapted to receive a visible portion of a paper sheet, a paper sheet source of supply in said housing below said tray member adapted to supply paper over the front end of said tray member to said flat, exposed portion of said tray member, a carriage unit having a depending panel slideably mounted on said tray member, paper gripping means on said carriage unit for gripping an end of said paper sheet whereby sliding movement of said carriage unit will move said paper sheet across said exposed portion of said tray member, a ratchet plate member slideably mounted for reciprocal movement on said tray member between said carriage unit and said tray member, said ratchet plate member including an actuating clip disposed in front of said tray member and integrally connected to said operating member by means of a pair of arms extending forward from the sides of said operating member, and a plurality of substantially equally spaced slots in said ratchet member which are successively operatively engageable with said pawl to provide a ratchet engagement between said ratchet plate member and said carriage unit whereby reciprocal movement of said actuating clip will cause selective sliding movement of said carriage unit rearwardly on said tray member to move said paper sheet upwardly between said forwardly extending legs of said ratchet plate member and rearwardly across said flat, exposed portion of said tray member.

References Cited in the file of this patent

UNITED STATES PATENTS

| | | |
|---|---|---|
| 487,953 | Maxwell | Dec. 13, 1892 |
| 755,625 | Curtin | Mar. 29, 1904 |
| 980,702 | Thexton | June 3, 1911 |
| 2,305,235 | Byrnes | Dec. 15, 1942 |
| 2,309,480 | Schneider et al. | Jan. 26, 1943 |
| 2,340,969 | Lister | Feb. 8, 1944 |